TIME-BANDWIDTH REDUCTION SYSTEM FOR IMAGE SIGNAL TRANSMISSION

Filed Aug. 15, 1962 5 Sheets-Sheet 1

INVENTORS
CHARLES F. TEACHER
MELVIN E. PARTIN
BY Robert D. Sanborn
ATTORNEY

TIME-BANDWIDTH REDUCTION SYSTEM FOR IMAGE SIGNAL TRANSMISSION

Filed Aug. 15, 1962 5 Sheets-Sheet 2

INVENTORS
CHARLES F. TEACHER
MELVIN E. PARTIN
BY
Robert D. Sanborn
ATTORNEY

TIME-BANDWIDTH REDUCTION SYSTEM FOR IMAGE SIGNAL TRANSMISSION

Filed Aug. 15, 1962 5 Sheets-Sheet 3

INVENTORS
CHARLES F. TEACHER
MELVIN E. PARTIN
BY Robert D. Sanborn
ATTORNEY

April 7, 1964 C. F. TEACHER ETAL 3,128,338

TIME-BANDWIDTH REDUCTION SYSTEM FOR IMAGE SIGNAL TRANSMISSION

Filed Aug. 15, 1962 5 Sheets-Sheet 4

INVENTORS
CHARLES F. TEACHER
MELVIN E. PARTIN
BY
Robert D. Santori
ATTORNEY

TIME-BANDWIDTH REDUCTION SYSTEM FOR IMAGE SIGNAL TRANSMISSION

Filed Aug. 15, 1962 5 Sheets-Sheet 5

INVENTORS
CHARLES F. TEACHER
MELVIN E. PARTIN
BY
Robert D. Sanborn
ATTORNEY

United States Patent Office 3,128,338
Patented Apr. 7, 1964

3,128,338
TIME-BANDWIDTH REDUCTION SYSTEM FOR IMAGE SIGNAL TRANSMISSION

Charles F. Teacher, Philadelphia, and Melvin E. Partin, Montgomeryville, Pa., assignors to Philco Corporation, Philadelphia, Pa., a corporation of Delaware Filed Aug. 15, 1962, Ser. No. 217,044
12 Claims. (Cl. 178—6.8)

The present invention relates to image transmission systems and more particularly to systems including means for minimizing the time-bandwidth product required to transmit images.

It is conventional to transmit images from one point to another by scanning the image point by point to develop an electrical signal having an amplitude variation proportional to the density variation along the scanning path. The conventional constant speed rectilinear scan has the disadvantage that the bandwidth of the transmission system is not fully utilized when scanning areas of low detail. Systems employing variable velocity scanning rasters have been proposed. However, such systems tend to be quite complex. Also it is often difficult to maintain proper registration between the scanning means at the transmitter and the reproducing means at the receiver.

It is an object of the present invention to provide an improved image transmission system which makes efficient use of available bandwidth.

Another object of the present invention is to provide a simple economical means for maintaining proper registration between scanning means at the transmitter and at the receiver.

In general, these and other objects of the present invention are achieved by providing a mask formed with spaced reference lines. Means are also provided for scanning the image to be transmitted. The scanning of the mask and the scanning of the image occur in synchronism. Reference signals are generated as said lines on said mask are scanned. Video signals are generated as the image to be transmitted is scanned. Means are provided for detecting the presence of detail in an area of the image bounded in part by two adjacent reference lines. The image scanning means is caused to retrace and rescan preferably at a slower rate the area in which a difference in the video signal is detected. The video signal and the block signals generated in response to the detection of detail are combined for transmission to a remote receiver.

For a better understanding of the present invention together with other and further objects thereof reference should now be had to the following detailed description which is to be read in conjunction with the accompanying drawings in which FIGS. 1–A and 1–B together form a detailed diagram of a preferred embodiment of a transmitter arranged in accordance with the present invention;

Figure 1A:
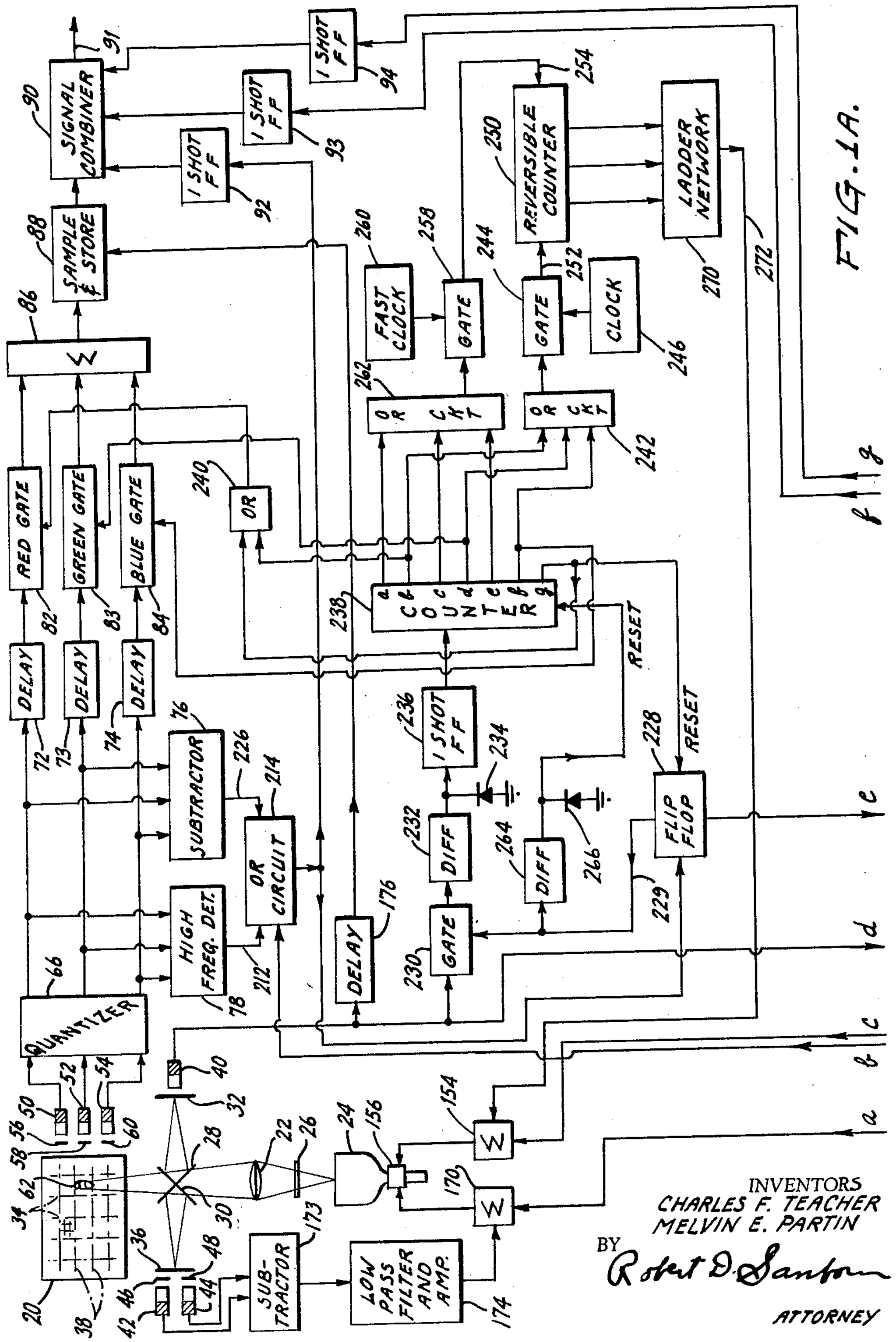
Figure 7:
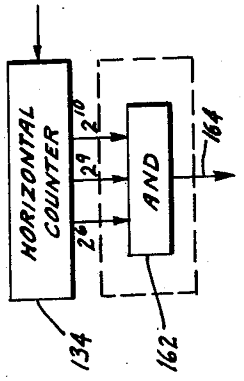
Figure 1B:
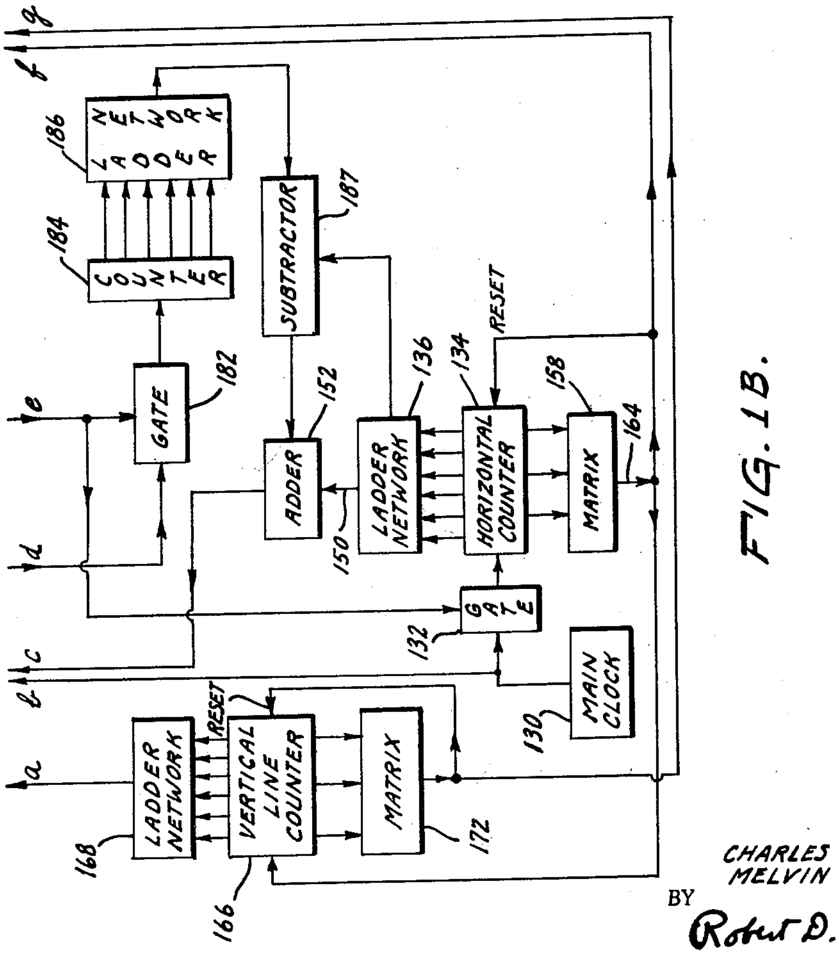
Figure 6:
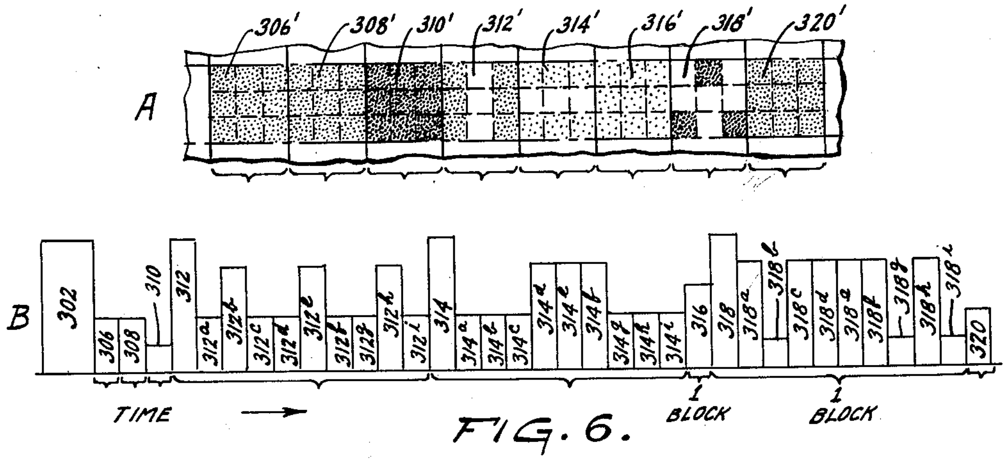
Figure 8:
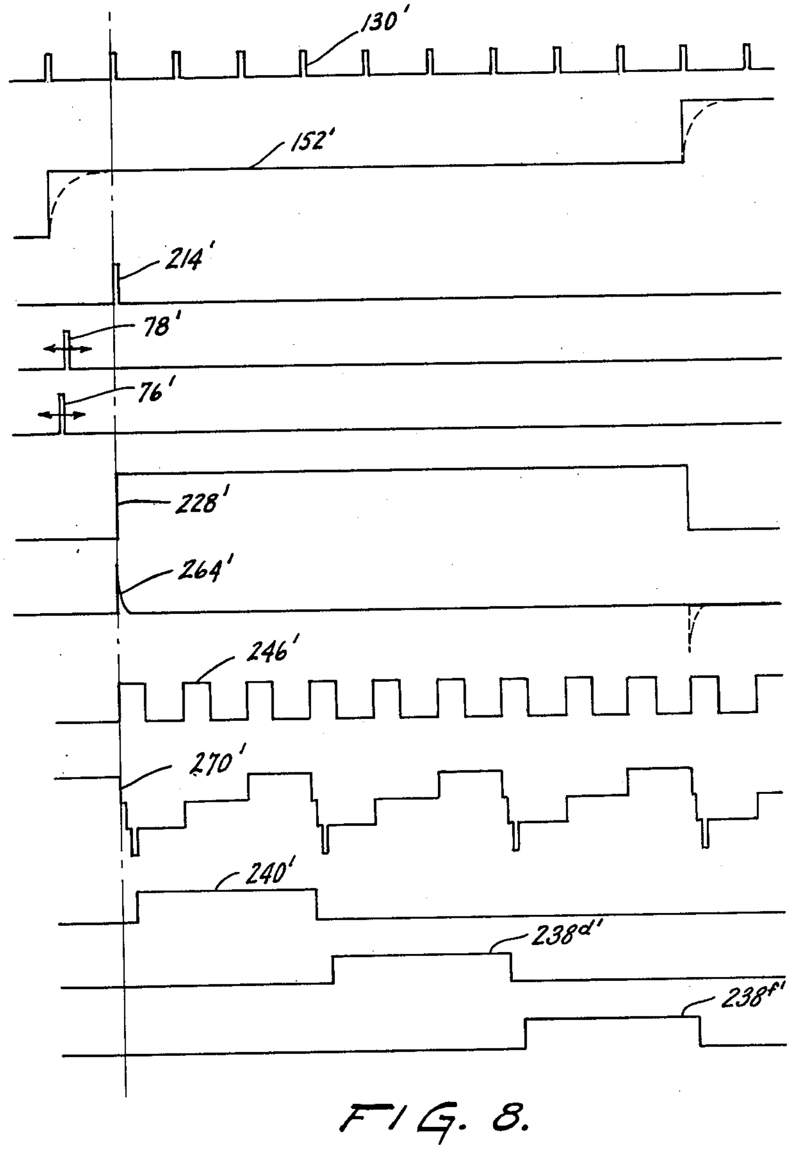
Figure 9:
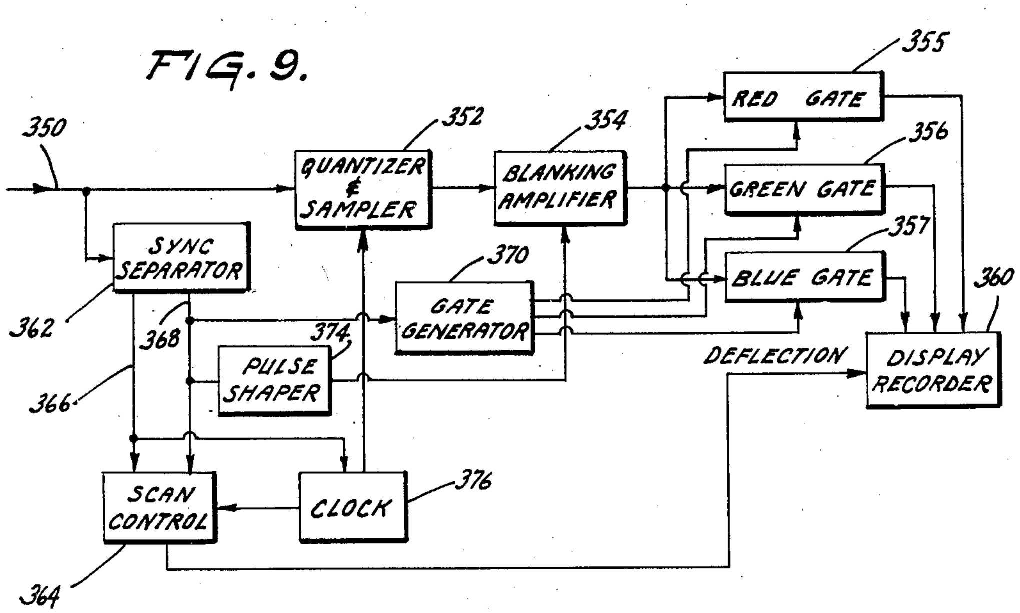
Figure 10:
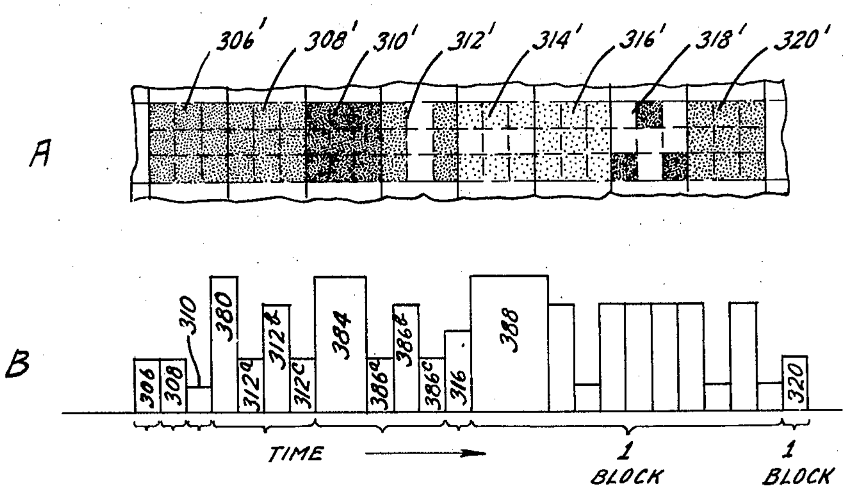

FIGS. 6–A and 6–B together illustrate the output signal generated in response to scanning certain image patterns;

FIG. 7 is a detailed block diagram of a portion of the circuit of FIG. 1–B;

FIG. 8 is a series of waveforms taken at various points in the system of FIGS. 1–A and 1–B;

FIG. 9 is a block diagram of a receiver capable of utilizing the signal provided by the system of FIGS. 1–A and 1–B;

FIG. 10 is a representation of the signal obtained from a second embodiment of the invention.

In the embodiment shown in the FIGS. 1–A and 1–B it will be assumed that fixed copy such as a black and white photographic print is scanned by a flying spot scanner and that the light reflected from the copy is picked up by a plurality of photocells. However, it is to be understood that both the copy and the scanning means may take other forms. For example, the "copy" may be a transparency or a scene viewed through suitable optics. The scanning means may be a multibeam television pickup tube or the like.

In FIG. 1–A the copy to be reproduced is shown at 20 in the upper left corner. A lens 22 images the screen of flying spot scanner 24 on copy 20. Preferably the image of the active area of the screen of flying spot scanner 24 coincides with the area of the copy 20 to be reproduced.

A prism 26 is provided between scanner tube 24 and lens 22. As will be explained in more detail presently, prism 26 converts the single white spot on the face of scanner tube 24 to a plurality of differently colored spots on copy 20.

Two partially reflecting mirrors 28 and 30 are placed between lens 22 and copy 20. Mirror 30 causes the screen of scanner tube 24 to be imaged on a generally opaque mask 32. Mask 32 is provided with a plurality of evenly spaced, parallel, transparent reference lines. Broken lines 34 on copy 20 represent the portions of the copy which are scanned at the same times as the reference lines on mask 32.

Mirror 28 causes the screen of scanner tube 24 to be imaged on a second mask 36 which is provided with horizontally disposed transparent index lines. Again, broken lines 38 on copy 20 represent the portions of the copy which bear the same relationship to the scanning element as the lines on mask 36.

A single photocell 40 is provided for registering the intensity of the light passing through mask 32. Each of two photocells 42 and 44 views the entire area of mask 36. A red filter 46 is interposed between mask 36 and photocell 42 and a blue filter 48 is interposed between mask 36 and photocell 44.

Three additional photocells 50, 52, and 54 are positioned so that each receives light reflected from the entire area of copy 20 which is to be reproduced. Photocells 50, 52 and 54 are provided with a red filter 56, a green filter 58 and a blue filter 60, respectively, so that each photocell responds to light of one color.

Figure 2:
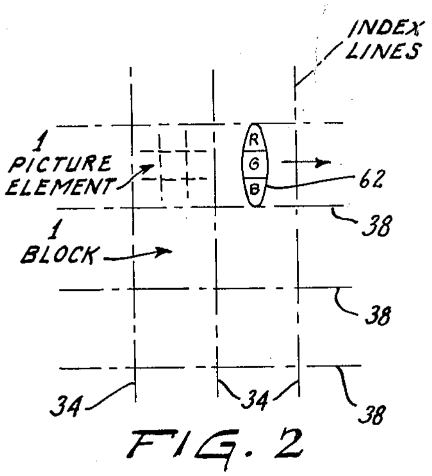
FIG. 2 is a detailed diagram showing the relationship of the scanning beam to index and reference lines of the system.

Reference should now be had to FIG. 2 for a more detailed showing of the relationship between the spot provided by scanner tube 24, prism 26, lens 22 and the reference and index lines provided by masks 32 and 36. As shown in FIG. 2 the elliptical spot 62 occupies substantially the entire space between the index lines 38 established by mask 36. The prism 26 causes the upper end of spot 62 to have a predominantly red color, the center potrion to have a predominantly green color, and the lowermost portion to have a predominantly blue color. It is to be understood that the reference to lower-most and upper-most are employed only for identification in the drawing. Since photocells 50, 52 and 54 respond only to red, green and blue signals, respectively, it will be seen that the combination just described provides the equivalent of three simultaneous scans along adjacent, parallel paths on copy 20. Other means for scanning three adjacent parallel paths may be substituted for the means shown. For example, scanner 24 may provide three parallel beams, each intensity modulated at a different frequency. Prism 26 may then be omitted and optical filters 56, 58 and 60 replaced by suitable electrical filters connected to the outputs of phototubes 50, 52, and 54.

The vertically disposed reference lines 34 are spaced apart by substantially the same distance as horizontally disposed index lines 38. Therefore the image on copy 20 is, in effect, divided into blocks, each block being defined by two lines 34 and two lines 38 and including nine picture elements.

The signals from the three photocells 50, 52 and 54 pass through individual multilevel quantizers which are collectively represented by block 66 in FIG. 1–A. The individual quantizers are represented by blocks 68–70 in FIG. 3. Each of the quantizers 68–70 may be an analog to digital converter followed by a digital to analog converter. Single circuits for accomplishing multilevel quantization are also known in the art. The outputs of individual quantizers 68–70 are supplied to the inputs of delay means 72, 73, 74, respectively. Delay means 72–74 provide substantially equal delays. In the example illustrated in FIG. 1–A it will be assumed that these delays are equal to the time required to scan from one reference line 34 to the next at the normal rate of scan of the system. The outputs of delay means 72–74 are connected by way of gates 82, 83, and 84 to the three inputs of an adder circuit 86. As will be explained in more detail presently, only one of the gates 82–84 is conditioned for the passage of a signal at any time.

The output of adder circuit 86 is connected to a sampling and storage circuit 88 which may take the form of a conventional boxcar circuit. The output of circuit 88 is connected to a signal combiner circuit 90 which also receives inputs from three one-shot flip-flops 92, 93, and 94. As will be explained in more detail presently, flip-flops 92–94 are energized by the synchronizing circuits of the system of FIGS. 1–A and 1–B.

Figure 5:
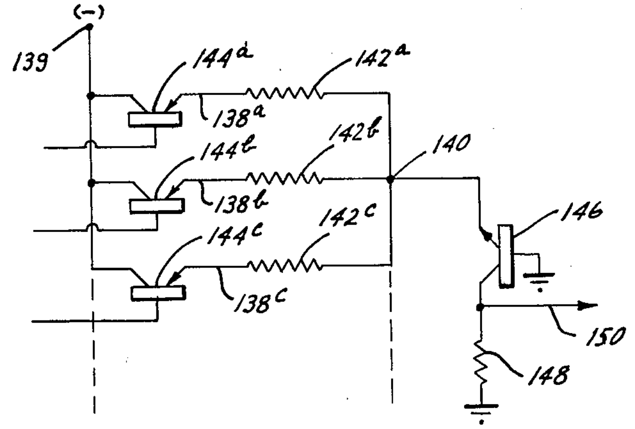
FIG. 5 is a detail showing of a ladder network of the type employed in FIGS. 1–A and 1–B.

A source of periodic signals 130 in FIG. 1–B provides the main clock or timing pulses for the circuit of FIGS. 1–A and 1–B. These main clock pulses are supplied by way of a normally open gate circuit 132 to the input of horizontal counter 134. Counter 134 may be a binary counter having sufficient stages to count to at least 1600. The several outputs of counter 134 are connected to a ladder network 136. Ladder network 136 is shown in more detail in FIG. 5. It comprises a plurality of branches 138*a*, 138*b*, 138*c*, etc. which are connected between terminal 139 of a source of fixed potential represented by the minus sign and a common terminal 140. Each branch comprises a resistor and the emitter-collector circuit of a transistor. The base connection of each of transistors 144*a*, 144*b*, 144*c*, etc. is connected to a respective one of the output taps of horizontal counter 134. The resistors 142*a*, 142*b*, 142*c*, etc. have different values of resistance, each value of resistance being representative of the count registered by the corresponding tap on counter 134. Common terminal 140 is also the emitter terminal of a grounded-base emitter follower circuit which includes grounded base transistor 146 and a resistor 148. Thus the signal present on output 150 of the ladder network 136 is a voltage which increases in linear steps at a rate controlled by the main clock 130. The signal present on output 150 of ladder network 136 is supplied by way of adder circuits 152 of FIG. 1–B and 154 of FIG. 1–A to the horizontal deflection coils of deflection yoke 156 of flying spot scanner 24.

Selected outputs of horizontal counter 134 are also connected to a matrix circuit 158. Matrix circuit 158 provides an output signal when horizontal counter 134 has reached a predetermined count. Matrix circuits of this type are well known in the art, but in the interest of completeness a more detailed showing of the connection between counter 134 and matrix 158 is shown in FIG. 7. As shown in FIG. 7, the outputs of horizontal counter 134 which represent the counts of $2^6$, $2^9$, and $2^{10}$ are connected to the three inputs of an "and" gate 162. A signal is provided at output 164 of "and" gate 162 only when the three outputs of horizontal counter 134 just mentioned are energized. These three outputs are energized when counter 134 reaches the count of 1600.

The output 164 of matrix 158 is connected to the "reset" input of counter 134 and to the signal input of vertical line counter 166. The outputs of vertical line counter 166 are connected to the inputs of a second ladder network 168. Ladder network 168 supplies a stepped deflection signal to the vertical deflection coils of yoke 156 by way of adder circuit 170 of FIG. 1–A.

Selected outputs of vertical counter 166 are connected to the inputs of a second matrix circuit 172. The output of matrix circuit 172 is connected to the "reset" terminal of counter 166. Matrix 172, vertical line counter 166, and ladder network 168 may be similar to matrix 158, horizontal counter 134 and ladder network 136, respectively.

Mask 36, filters 46 and 48, and photocells 42 and 44 form part of a vertical deflection correction or indexing system. The outputs of photocells 42 and 44 are connected to a subtractor circuit 173. The output of subtractor circuit 173 is supplied by way of low-pass filter and amplifier circuit 174 to a second input of adder circuit 170.

Mask 32 and photocell 40 form a horizontal reference system. The pulse signals supplied by photocell 40 are supplied to the input of normally open gate 182 of FIG. 1–B. Gate 182, counter 184, ladder network 186 and subtractor circuit 187 form a position control or indexing system for the horizontal sweep. Counter 184 and ladder network 186 may be similar to horizontal counter 134 and ladder network 136, respectively. If the horizontal sweep is proceeding at the proper rate in the horizontal direction under control of signals from main clock 130 the output of ladder network 136 will be identical to the output of ladder network 186. Under the condition just mentioned there will be no output from subtractor 187. If the horizontal sweep is not proceeding exactly according to the voltage produced by ladder network 136, due to irregularity in the deflection coil or the like, the output signals from ladder network 136 and 186 will not be equal and subtractor 187 will provide a correction signal to a second input of adder circuit 152. As shown in FIGS. 1–A and 1–B, the output signal of adder 152 is supplied by way of adder circuit 154 to the deflection yoke 156.

The scanning circuits just described operate as follows. Main clock 130, horizontal counter 134 and ladder network 136 produce appropriate potentials for causing the beam of the flying spot scanner to trace a horizontal path across copy 20. Gate 182 is normally operative to pass a signal. Photocell 40 generates a pulse each time the flying spot scanner passes a point corresponding to one of the reference lines 34. Any deviation of the horizontal sweep from its intended value will result in a difference between the outputs of ladder network 136 and ladder network 186. The correction signal supplied by subtractor 187 corrects the position of the spot 62 on copy 20.

At the end of the horizontal sweep, that is, at the end of a predetermined number of clock pulses, matrix 158 provides a reset signal to horizontal counter 134 which resets counter 134 to zero and initiates the start of the next horizontal sweep. The output of matrix 158 is also supplied to the input of vertical line counter 166. Vertical line counter 166 and ladder network 168 produce a vertical sweep voltage which advances the position of the spot 62 on copy 20 one block in the vertical direction for each horizontal sweep.

If the spot 62 is deviated upwardly from its intended position for any reason, the red portion of the spot will coincide with one of the transparent index lines 38 on mask 36. Under these conditions photocell 42 generates an output signal but photocell 44 does not. Subtractor circuit 173 provides a correction signal by way of low pass filter and amplifier 174 to adder circuit 170. The polarity of this correction signal is such as to restore the spot to its intended path on copy 20. Conversely, if the spot 62 is displaced downwardly from its proper path, photocell 44 generates an output signal while photocell 42 does not. Therefore a correction signal of the opposite polarity is supplied to adder circuit 170.

At the end of a preselected number of vertical lines, matrix 172 provides a reset signal to vertical counter 166. This returns the spot 62 to the position it occupied at the start of the scan. Since only one complete scan of the copy 20 is required for the proper transmission of the image, the output signal of matrix 172 may be supplied to means (not shown) for rendering the system inoperative or for advancing another piece of copy to the position occupied by copy 20.

During normal scan, gate 82 of FIG. 1–A is conditioned to pass a signal while gates 83 and 84 are conditioned to block signals. Thus the signal supplied by photocell 50 is passed through quantizer 66, delay circuit 72, gate 82, adder circuit 86 and circuits 88 and 90 to the output connection 91 of the system. The output 91 of the system may be supplied to a suitable signal transmission device such as a wire line or a radio transmitter. As will be explained in more detail presently, normal scan is employed only if there is no substantial variation in density within the block being scanned. If there is no substantial variation in density the three signals supplied by photocells 50–52 are substantially alike and only one need be transmitted.

The pulse signals provided by photocell 40 as the spot 62 progresses across the reference lines 34 are also supplied by delay means 176 to sample and storage circuit 88. Upon receipt of a signal from delay means 176, circuit 88 is reset to register the amplitude signal currently being supplied by gate 82. This amplitude is maintained until the next signal is supplied by delay circuit 176.

Figure 3:
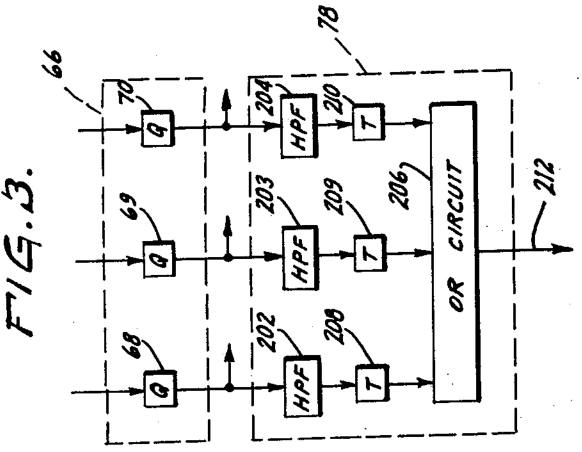
FIG. 3 is a detailed diagram of the quantizer and high frequency detector circuit of FIG. 1–A.

The remainder of the system shown in FIGS. 1–A and 1–B comprises means for detecting the presence of detail in the block being scanned and changing the scan characteristics accordingly. This is accomplished by detecting the presence of high frequency components in the signal supplied by any one of the photocells 50, 52, and 54 and/or detecting any differences in amplitude of the signal supplied by these three photocells 50, 52 and 54. High frequency components in the signals provided by photocells 50, 52, and 54 represent relatively rapid changes in density along a horizontal line. These high frequency components are detected by high frequency detector 78. This circuit is shown in more detail in FIG. 3. As shown in FIG. 3, circuit 78 comprises three high pass filters 202, 203, and 204 connected to the outputs of quantizers 68, 69 and 70, respectively. Filters 202–204 are connected by way of threshold circuits 208, 209 and 210, respectively, to three inputs of "or" circuit 206. "Or" circuit 206 provides a signal on output connection 212 if one or more of the filters 202–204 provides an output signal which exceeds the threshold level of the associated threshold circuit 208–210. As shown in FIG. 1–A, output 212 is connected to one input of a gated "or" circuit 214.

Figure 4:
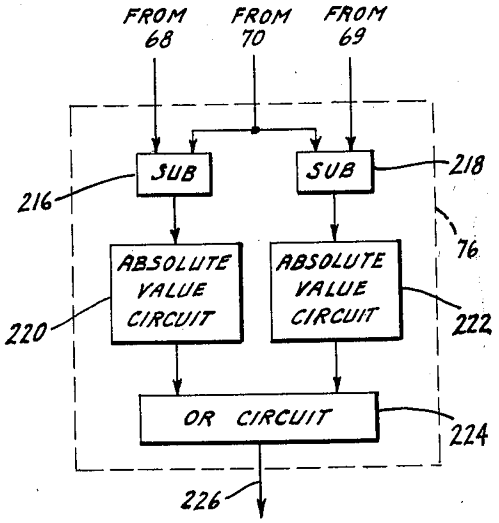
FIG. 4 is a detailed block diagram of the subtractor circuit of FIG. 1–A.

Subtractor circuit 76 provides means for detecting the presence of a difference in the amplitudes of the signals supplied by photocells 50, 52 and 54, respectively. Subtractor circuit 76 is shown in more detail in FIG. 4. Subtractor unit 216 of FIG. 4 receives an input from quantizer 68 and a second input from quantizer 70 of FIG. 3 and provides an output signal if there is any difference between these two input signals. Similarly, subtractor unit 218 receives input signals from quantizer 70 and quantizer 69, and provides an output signal if there is any difference between the two input signals.

Absolute value circuits 220 and 222 provide output signals which are dependent only on the amplitude and not the polarity of the output signals of subtractor units 216 and 218. Two inputs of "or" circuit 224 are connected to the outputs of absolute value circuits 220 and 222, respectively. Thus "or" circuit 224 will provide a signal at output 226 if there is any difference in amplitude between the signals supplied by quantizers 68–70.

As shown in FIG. 1–A, output 226 of subtractor 76 is supplied to a second input of gated "or" circuit 214. "Or" circuit 214 provides an output signal if either input 212 or input 226 is energized. This signal is generated in time coincidence with a timing pulse from clock 130. "Or" circuit 214 may include suitable signal storage means, such as a capacitor, to maintain the signal supplied by circuit 76 or 78 until the next clock pulse occurs.

The output of "or" circuit 214 is connected to flip-flop 228 to control the setting of this flip-flop. When flip-flop 228 is in the "set" condition in response to a signal from "or" circuit 214, gates 132 and 182 of FIG. 1–B are rendered inoperative to pass signals. Thus the horizontal and vertical deflections of the beam of scanner 24 are frozen at their pre-attained values.

The signal present at output 229 of flip-flop 228 causes normally closed gate circuit 230 to be conditioned to pass signals received from photocell 40. The output of gate circuit 230 is connected by way of differentiator 232, negative clipping diode 234 and one-shot flip-flop 236 to the input of counter circuit 238. Counter circuit 238 may be a conventional counter circuit in which output connections $a$ through $g$ are energized in sequence as spaced pulse signals are supplied by flip-flop 236. Negative clipper 234 insures that only one pulse will be supplied by flip-flop 236 for each pulse supplied by photocell 40.

The function of counter 238 is to control the rescanning sequence of flying spot scanner 24 when a signal from circuit 214 indicates that the block just scanned includes detail which will not be reproduced under normal scan conditions. In general, counter 238 causes the spot 62 to make three rapid retraces and three slow forward scans between two of the lines 34. This is accomplished in the following manner. The outputs $b$, $d$, and $f$ of counter 238 are connected to three inputs of "or" circuit 242. The output connection of "or" circuit 242 is connected to the control input of normally blocked gate circuit 244. A clock pulse source 246 is coupled to the signal input of gate 244. Preferably clock pulse 246 provides pulses at the repetition rate of main clock circuit 130 of FIG. 1–B. The output of gate 244 is connected to one input of a reversible counter 250. Reversible counter 250 may be similar to counters 134 and 166 of FIG. 1–B except that counter 250 will count in one direction in response to signals supplied in input 252 and will count in a reverse direction in response to input signals supplied to input 254. A count of three is required in the present example. Therefore counter 250 may be provided with three outputs which are energized in sequence.

A gate circuit 258 couples the output of a third periodic clock signal source 260 to input 254 of counter 250. Outputs $a$, $c$, and $e$ of counter 238 are connected to three inputs of "or" circuit 262. The output of "or" circuit 262 is connected to the control input of gate 258. Fast clock source 260 provides a signal having a frequency several times that of the clock source 246.

Retrace and rescan are accomplished in the following manner. Output 229 of flip-flop 228 is also coupled to the "Reset" input of counter 238 by way of differentiator 264 and diode clipper 266. Counter 238 is reset when flip-flop 228 is set by circuit 214. In its reset condition output $a$ is energized. Reversible counter 250 is normally at its maximum count. The signal on output $a$ of counter 238 permits fast clock pulses from source 260 to be supplied to reversible counter 250. The amplitude of the signal present on output 272 of ladder network 270 will decrease as the count registered by counter 250 decreases. This will result in spot 62 moving to the left. This movement will continue until spot 62 coincides with one of the index lines 34. That is, spot 62 will retrace one whole block at a rapid rate. When spot 62 coincides with one of the reference lines 34, photocell 40 supplies a signal by way of gate 230, differentiator 232, clipper 234 and one-short flip-flop 236 to counter 238. This causes output *a* to be de-energized and output *b* to be energized. With output *a* de-energized the signals from clock 260 are no longer supplied to input 254. Instead gate 244 permits signals from source 246 to be supplied to input 252 of counter 250. This causes counter 250 to increase its count and thereby increase the amplitude of the signal at output 272. Spot 262 is then deflected to the right at a rate equal to one third the normal scan speed.

When spot 62 again coincides with one of the reference lines 34 a signal is again supplied by photocell 40 which results in counter 238 being stepped to the next highest count. That is, output *c* is energized and output *b* is de-energized. With output *c* energized the reversible counter is again returned to a lower count and spot 62 is again deflected to the left. Spot 62 continues to oscillate between two lines 34 as outputs *d, e* and *f* of counter 238 are energized. At the end of the third sweep to the right, the signal generated by photocell 40 causes output *g* to be energized. This resets flip-flop 228 and deactuates gate 230. At the sametime gates 132 and 182 of FIGURE 1–B and gate 82 of FIG. 1–A are conditioned to pass signals. Normal sweeping operation is then resumed with reversible counter 250 maintained at its high count condition.

Each of the photocells 50, 52 and 54 supplies a continuous output signal. However, during normal scanning operations only gate 82 is conditioned to pass a signal. The activating signal for gate 82 is supplied by output *g* of counter 238 by way of "or" circuit 240. Since normal scan is employed only when there is no variation in density within the block, the signals provided by all three photocells 50, 52 and 54 will be equal and only one need be transmitted.

Gates 82, 83 and 84 are conditioned to pass signals on the first, second and third slow rescans, respectively, which follow the generation of a signal by circuit 214. This is accomplished by coupling outputs *d* and *f* of counter 238 directly to gates 83 and 84 and by coupling outputs *b* to gate 82 by way of "or" circuit 240.

The output of "or" circuit 214 is also connected to an input of single-shot flip-flop 92. Flip-flop 92 supplies a synchronizing pulse to signal combiner 90 to indicate that a change in the mode of scan is being initiated. The signal provided by flip-flop 92 will be identified hereinafter as a block pulse. The signal provided by flip-flop 92 may have duration of one clock pulse interval. The output of matrix 158 and the output of matrix 172 are connected to single shot flip-flops 93 and 94, respectively. Single shot flip-flop 93 provides an "end of line" pulse to signal combiner 90 while single shot flip-flop 94 provides an "end of frame" pulse to signal combiner 90. The signals provided by flip-flops 93 and 94 should differ from each other and from the signal provided by flip-flop 92 in amplitude and/or time duration so that the receiver may identify the nature of the information being transmitted. All three flip-flops 92–94 provide signals having amplitudes greater than the maximum signals provided by adder 86. This permits separation of the sync signals from the video signals by simple clipper circuits.

The operation of the system of FIGS. 1–A and 1–B will now be explained with reference to the diagram of FIG. 6. FIG. 6–A is a portion of copy 20. The variations in density shown in FIG. 6–A have been arbitrarily chosen to illustrate all modes of operation of the system. FIG. 6–B is a time versus amplitude plot of the signal which will appear at the output 91 as the copy shown in FIG. 6–A is scanned. In FIG. 6–A it will be assumed that synchronizing pulses have a relative amplitude of 10, white areas a relative amplitude of 8, light gray areas a relative amplitude of 6, medium gray areas a relative amplitude of 4 and dark gray areas a relative amplitude of 2.

Pulse 302 represents a synchronizing pulse and may, for example, represents an end of line pulse. Pulses 306, 308 and 310 of FIG. 6–B represent areas 306′ 308′ and 310′ in FIG. 6–A. Each of these three pulses represents the density of all nine picture elements of the corresponding block in FIG. 6–A. Pulse 310 has a smaller amplitude than pulses 306 and 308 since area 210′ is darker than areas 306′ and 308′.

Pulse 312 is a block pulse generated by single shot flip-flop 92 in response to a signal from "or" circuit 214. The presence of this pulse indicates that an output has occurred from either high frequency detector circuit or subtractor 76 or both. In the example of FIG. 6 the signal is provided by high frequency detector 78 only since block 312′ contains variations in density in the horizontal direction but no variations in density in the vertical direction. Since detail has been detected in the block 312′, the entire block is rescanned at a slow speed. Pulses $312^a$, $312^b$ and $312^c$ represent the signals supplied by photocell 50 during the first rescan of the block. These signals are passed by red gate 82 to adder circuit 86. The next three pulses $312^d$, $312^e$, and $312^f$ represent the signals generated by photocell 52 on the second rescan of block 312. These signals are passed by green gate 83 to adder circuit 86. Similarly the last three pulses $312^g$, $312^h$ and $312^i$ represent the pulses generated by photocell 54 and passed by gate 84. It will be understood that signals corresponding to pulses $312^g$–$312^i$ are generated three times in succession, i.e. once on each rescan. Only the last group is permitted to pass gate 84.

At the termination of the third rescan, which produces pulses $312^g$–$312^i$, counter 238 of FIG. 1–A restores the system to normal scan condition. However, as shown in FIG. 6–A, the next block 314′ produces an output from subtractor circuit 76. Block pulse 314 is generated by flip-flop 280 to indicate the "or" circuit 314 again has an output. Block 314′ is rescanned at a slow speed. The resulting pulses are represented by the nine pulses $314^a$–$314^i$. following pulse 314. Again pulses $314^a$–$314^c$ are passed by gate 82, pulses $314^d$–$314^f$ are pasesd by gate 83 and the final three pulses $314^g$–$314^i$ by gate 84. At the end of the third rescan of block 314 normal scan is resumed.

Block 316′ is again represented by a single pulse 316 since there is no variation in density throughout block 316.

Block pulse 318 indicates that detail is detected in block 318′. In this instance both high frequency detector 78 and subtractor 76 have outputs. Again, the nine pulses $318^a$–$318^i$ following block pulse 318 represent the outputs of photocells 50, 52 and 54 as passed sequentially by gates 82, 83 and 84. The final block 320′ is represented by a single pulse 320 since there is no variation in density in this block.

FIG. 8 is a time versus amplitude plot of certain signals present at selected points in FIGS. 1–A and 1–B. The waveforms of FIG. 7 have been given prime reference numerals corresponding to similarly numbered blocks in FIGS. 1–A and 1–B. Thus wave form 214′ of FIG. 8 represents the output signal of gated "or" circuit 214 of FIG. 1–A, etc. The waveforms of FIG. 8 represent the signals present during the scan of a block such as block 318′ of FIG. 6–A.

While the present invention is concerned mainly with means for transmitting an image, a block diagram of a typical receiver is shown in FIG. 9 to illustrate the manner in which the signal generated by the system of FIGS. 1–A and 1–B may be utilized. The signal input from the data link is shown at 350. The data link may be any suitable means for coupling output 91 of FIG. 1–A to input 350 of FIG. 9. Input 350 is coupled to a quantizer and sampler circuit 352 which removes minor variations in amplitude introduced in the data link. The output of circuit 352 is connected by way of amplifier 354 and the three gates 355, 356 and 357 to three inputs of a display recorder 360. Display recorder 360 may be a triple gun cathode ray tube. It is not necessary that this tube have a color screen since the red, green and blue signals represent only different lines on the image and not different colors of the original image. Display recorder 360 preferably has means such as a direct view storage tube for maintaining the image during time of transmission of the entire frame. Alternatively a conventional cathode ray tube having a photographic film positioned to be exposed by the screen thereof may be employed. The latter system will generate a permanent record of the image.

A sync separator circuit 362 is also coupled to input 350. Sync separator circuit 362 may be a conventional bottom clipping circuit which separates out the high amplitude sync pulses from the remainder of the signals.

Scan control 364 may be any suitable circuit for generating the deflection signals for display recorder 360. For example, they may be similar to the sweep circuits shown in FIGS. 1–A and 1–B. End of line and end of frame sync pulses supplied by way of connection 366 will cause the scan control 364 to generate appropriate signals to form a rectangular raster similar to the normal sweep at the transmitter. The presence of a block control signal on connection 368 will cause the normal sweep to be interrupted and the next following block to be scanned three times at a rate one third the normal rate.

A gate generator 370 also receives block pulses from connection 368 and generates three sequential gates corresponding generally to three series of gating pulses, each series corresponding generally to wave forms 240' and 238b' and 238f' of FIG. 8. These gating pulses cause gates 355, 356 and 357 to be gated on in sequence during the slow scan. All three gates 355, 356 and 357 are conditioned to pass signals during normal scan so that simultaneous recording of the video signal on all three lines is accomplished. A pulse shaper 374, which receives an input signal from connection 368, supplies blanking signals to blanking amplifier 354. This blanking amplifier 354 prevents the block pulses from being recorded on display recorder 360.

The operations of scan control 364 and quantizer and sampler 352 are synchronized by a clock circuit 376. Clock circuit 376 is synchronized with the transmitter by means of synchronizing signals supplied to clock circuit 376 by way of connection 366.

As shown above, the system of FIG. 1 will transmit the 72 picture elements of FIG. 6–A in 35 pulse intervals. The system of FIG. 1 is capable of operating with more sophisticated codes with a still further reduction in the time-bandwidth product. FIG. 10 shows a code which may be employed with only minor modifications of the circuit of the FIGS. 1–A and 1–B. This pattern shown in FIG. 10–A is identical to the pattern of FIG. 6–A. The code shown in FIG. 10–B takes advantage of line to line correlation in both horizontal and vertical directions as well as element to element correlation. Blocks in which all elements have identical density are transmitted as a single brightness pulse as before with the same advantage that the level may change between blocks. Thus blocks 306', 308', and 310' are represented by pulses 306, 308 and 310 as before. A block such as block 312, which contains high horizontal frequencies but no differences in the vertical direction, will produce an output from the high frequency detector 78 but no output from subtractor 76. It will be assumed that a single interval block pulse 380 is generated when this condition exists. In response to an output from the high frequency detector 78 block 312 will be rescanned at one third normal speed but only once. At the receiver the speed of scan will be reduced to one third normal, but all three gates 355–357 will remain open, i.e. will pass signals.

A block such as block 314' which has no variation in the horizontal direction but differences in the vertical direction will produce an output from subtractor 76 but no output from high frequency detector 78. It will be assumed that a two interval block pulse 384 is generated when this condition exists. In response to the output signal of the subtractor 76 alone the beam may be stopped at the end of the block and gates 82, 83 and 84 gated on in sequence without rescanning the beam. Alternatively the block 314' may be rescanned three times at the fast speed. Again gates 82, 83 and 84 are conditioned to pass signals in sequence. The signals produced by either operation are shown as pulses 386a, 386b, and 386c, respectively.

Block 316' is again transmitted as a single pulse 316. No block pulse is necessary.

A block such as block 318' will produce an output from both high frequency detector 78 and subtractor 76. It will be assumed that a three interval block pulse 388 is generated when this condition exists. In response to a signal indicating an output from both subtractor 76 and high frequency detector 78, the entire block is rescanned at slow speed in the manner previously described. Thus the series of video pulses generated to represent the individual elements of block 318' will be identical to those shown in FIG. 6–B.

Block 320' will again be represented by a single interval pulse 320 which is identical to pulse 320 of FIG. 6.

Although twelve intervals are required to transmit the nine elements of a block such as block 218', the code chosen is still superior to that of FIG. 1 in time-bandwidth reduction. That is, the 72 picture elements of FIG. 10–A are transmitted in a total of 26 intervals. The circuit of FIG. 1 requires 35 intervals. Modification will be required in the end-of-line and end-of-frame pulses generated by flip-flops 93 and 94 since two and three interval block pulses are now employed. The end-of-line and end-of-frame pulses may take the form of four and five interval pulses or combinations of one interval pulses spaced not more than one interval apart. It will be seen that the one interval block pulses cannot be spaced closer than four intervals apart in the system just described.

The sync pulses and block pulses may be separated from the video signals at the receiver by amplitude selection as before. The nature of each block pulse or synchronizing pulse may be determined by suitable pulse width discriminator circuits.

While the invention has been described with reference to what is or present considered to be the preferred embodiment thereof, it will be apparent that various modifications and other embodiments thereof will occur to those skilled in the art within the scope of the invention. Accordingly we desire the scope of our invention to be limited only by the appended claims.

What is claimed is:

1. In an image scanning system adapted to receive an image to be scanned, the combination comprising a mask formed with spaced reference lines, image scanning means including a movable image scanning element, scan control means coupled to said image scanning means for causing said image to be scanned at a first rate, said image scanning means including means for generating a video signal representative of the density of the image along the path scanned, means associated with said image scanning means for causing said mask to be scanned in a direction transverse to said reference lines in synchronism with the scanning of said image, reference signal generating means associated with said mask for generating position reference signals coincident in time with the scanning of reference lines of said mask, detail detector means responsive to said video signal for producing signals indicative of the presence of image detail in an area delineated in part by the positions at which adjacent reference lines are scanned, means responsive to said signal provided by said detail detector means and said position reference signals for causing said image scanning means to retrace and rescan a portion of said image between positions corresponding to positions at which adjacent reference lines on said mask are scanned.

2. In an image transmission system adapted to receive an image to be scanned, the combination comprising a mask formed with spaced reference lines, image scanning means including a movable image scanning element, scan control means coupled to said image scanning means for causing the image to be scanned at a first rate, said image scanning means including means for generating a video signal representative of the density of the image along the path scanned, means associated with said image scanning means for causing said mask to be scanned in a direction transverse to said reference lines in synchronism with the scanning of said image, reference signal generating means associated with said mask for generating position reference signals coincident in time with the scanning of reference lines of said mask, detail detector means responsive to said video signal for producing block signals indicative of the presence of image detail in areas delineated in part by the positions at which adjacent reference lines are scanned, means responsive to said signal provided by said detail detector means and said position reference signals for causing said movable image scanning element to retrace and rescan portions of said image between positions corresponding to positions at which adjacent reference lines on said mask are scanned and signal combining means coupled to said image scanning means and said detail detector means for combining said video signals and said block signals.

3. In an image transmission system adapted to receive an image to be scanned the combination comprising a mask formed with spaced reference lines, image scanning means including a movable image scanning element, scan control means coupled to said image scanning means for causing said image scanning element to scan the image to be transmitted at a first rate, said image scanning means including means for generating a video signal representative of the density of the image along the path scanned by said scanning element, means associated with said image scanning means for causing said mask to be scanned in a direction transverse to said reference lines in synchronism with the scanning of said image, reference signal generator means associated with said mask for generating position reference signals coincidence in time with the scanning of reference lines of said mask, detail detector means for detecting the presence of components of said video signal which have a frequency above a preselected frequency, means responsive to said last mentioned detail detector means and said position reference signals for causing said movable scanning means to retrace and rescan at a rate different from said first rate portions of said image between positions corresponding to positions at which adjacent reference lines on said mask are scanned, block signal generator means responsive to the output of said detail detector means for generating a block signal upon inception of said retrace and rescan phase, and signal combining means coupled to said image scanning means and said block signal generator means for combining said video signal and said block signals.

4. A combination in accordance with claim 3 wherein said portion of said image is rescanned at a rate slower than said first rate.

5. In an image transmission system adapted to receive an image to be scanned, the combination comprising a mask formed with spaced reference lines, image scanning means including a movable image scanning element, said image scanning element being formed with a plurality of portions for scanning a plurality of parallel paths on said image, scan control means coupled to said image scanning means for causing said image scanning element to scan the image to be transmitted at a first rate, said image scanning means including means for generating a plurality of video signals, each video signal being representative of the density of the image along a respective one of said parallel paths scanned by said scanning element, means associated with said image scanning means for causing said mask to be scanned in a direction transverse to said reference lines in synchronism with the scanning of said image, reference signal generating means associated with said mask for generating position reference signals coincident in time with the scanning of reference lines of said mask, means coupled to said image scanning means for detecting the differences in amplitude, if any, in the video signals generated in the interval between the traversal of adjacent lines of said mask, means responsive to the output signals of said last mentioned means and said position reference signals for causing said movable image scanning element to retrace and rescan a portion of said image between positions corresponding to positions at which adjacent reference lines on said mask are scanned, and gated signal coupling means coupled to said image scanning means for selectively passing or suppressing video signals generated thereby.

6. The combination in accordance with claim 5 wherein said means coupled to said image scanning means for detecting differences in amplitude in the video signals detects the differences in amplitude if any between video signals representing different paths.

7. The combination in accordance with claim 5 wherein said means coupled to said image scanning means for detecting differences in amplitude in the video signals detects changes in the amplitude of video signals representing one path.

8. The combination in accordance with claim 5 wherein said means coupled to said image scanning means for detecting differences in amplitude in the video signals detects both differences in amplitude between video signals representing different paths and changes in amplitude of video signals representing one path.

9. In an image transmission system, the combination comprising a mask formed with spaced reference lines, image scanning means including a movable image scanning element, scan control means for causing said image scanning means to scan a plurality of parallel paths on said image at a first rate, said image scanning means including means providing at a plurality of outputs a plurality of video signals, each video signal being representative of density of the image along a respective one of said parallel paths, means associated with said image scanning means for causing said mask to be scanned in a direction transverse to said lines in synchronism with the scanning of said image, reference signal generating means associated with said mask for generating position reference signals coincident in time with the scanning of reference lines of said mask, means coupled to said image scanning means for detecting differences in amplitude of the video signals generated in the interval between the scanning of adjacent lines of said mask, means responsive to the output signals of said last mentioned means and said position reference signals for causing said image scanning means to retrace and rescan a portion of said image between positions corresponding to positions at which adjacent reference lines on said mask are scanned, a plurality of gated signal coupling means, each said coupling means being associated with a respective one of said plurality of outputs, control means coupled to said coupling means, said control means normally causing one of said coupling means to be conditioned to pass a video signal and the remainder of said coupling means to be conditioned to block video signals, means coupled to said control means for conditioning a different one of said coupling means to pass a signal on each rescan of a portion of said image, signal combining means coupled to said coupling means for combining video signals passed by said coupling means and means for supplying to said signal combining means signals indicative of the times at which said retrace and rescan phase is initiated.

10. The combination in accordance with claim 9, said combination further comprising a second mask, means for causing said second mask to be scanned in synchronism with the scanning of said image, said second mask being formed with index lines parallel to the normal path of said scan of said second mask, means responsive to the scanning of an index line of said second mask for correcting the position of scanning paths on said image.

11. The combination in accordance with claim 9, wherein said image scanning means includes a flying spot scanner, an optical system including a prism for imaging the screen of said flying spot scanner on the image to be transmitted, and wherein said means providing at a plurality of outputs a plurality of video signals comprises a plurality of photo responsive elements, each element being responsive to light of a different wave length.

12. The combination in accordance with claim 9, said combination further comprising receiver means, means for transmitting signals from said signal combining means to said receiver means, means at said receiver means for recording on a medium information indicative of received signal amplitudes in terms of image density, said information being recorded along a plurality of parallel paths, means for causing identical information to be recorded simultaneously in each of said paths in the absence of received block signals and in response to received video signals, means responsive to received block signals for causing said recording means to rescan a selected portion of said recording medium a plurality of times, and means for initiating recording in a different one of said recording paths on each rescan.

No references cited.